J. O. LUTHY.
SECONDARY BATTERY.
APPLICATION FILED JULY 7, 1914.
1,176,970.
Patented Mar. 28, 1916.
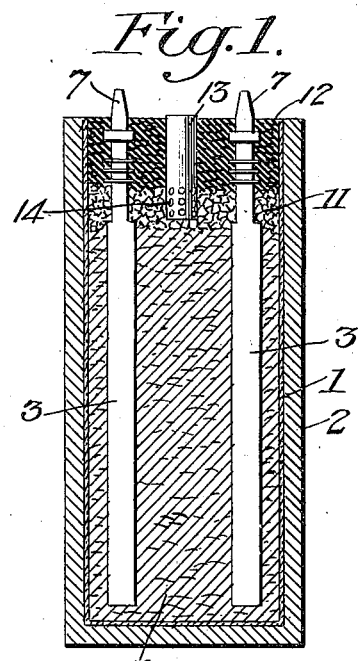
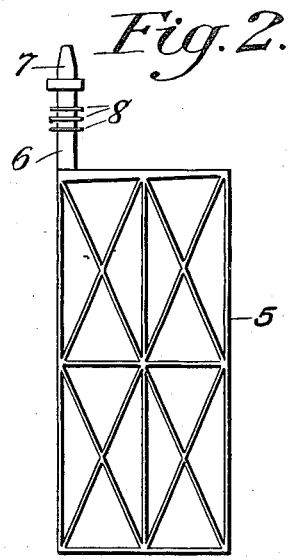
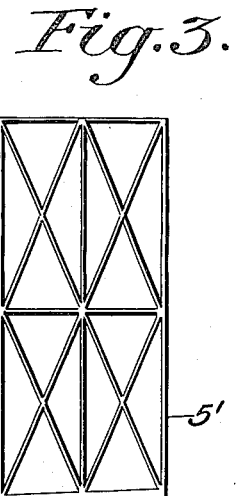
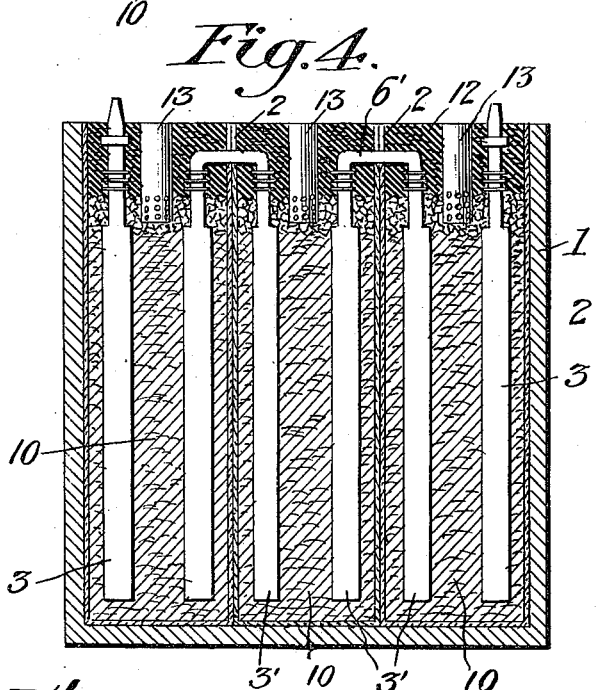
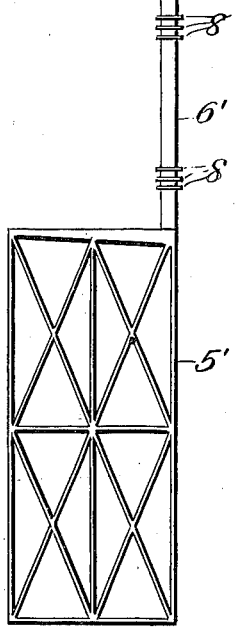
Witnesses.
Inventor:
Joseph O. Luthy

UNITED STATES PATENT OFFICE.

JOSEPH O. LUTHY, OF SAN ANTONIO, TEXAS.

SECONDARY BATTERY.

1,176,970. Specification of Letters Patent. Patented Mar. 28, 1916.

Application filed July 7, 1914. Serial No. 849,388.

*To all whom it may concern:*

Be it known that I, JOSEPH O. LUTHY, a citizen of the Republic of Switzerland, residing in the city of San Antonio, in the county of Bexar and State of Texas, have invented certain new and useful Improvements in Secondary Batteries; and I do hereby declare the following to be a full, clear, and exact description of the invention, such as will enable others skilled in the art to which it appertains to make and use the same.

The invention relates to storage batteries, more particularly to the construction of storage battery cells of the so-called dry type, in which the electrolyte surrounding the plates or electrodes is in the form of a paste.

The object of the invention is to provide a storage battery of the character indicated, which is simple in construction, comparatively light in weight, durable in operation, not liable to injury or deterioration, and that can be economically and effectively applied in substitution of the ordinary dry primary batteries, with the essential differences from the latter, namely, that it may be recharged repeatedly at small expense, that upon discharge it will deliver a steady voltage much higher than that of the primary battery, and that for the same capacity, it will weigh considerably less than such primary battery.

Typical forms of the improved storage or secondary battery are illustrated in the accompanying drawings, in which:—

Figure 1 is a sectional elevation of a two-plate battery or cell; Fig. 2 is a side elevation of one of the grids which supports the active material; Fig. 3 is a similar view showing a double grid; and Fig. 4 is a view similar to that shown in Fig. 1, showing a battery having multiple compartments or cells included within a single casing.

Referring to Figs. 1 and 2 of the drawing, 1 indicates an inner receptacle, preferably formed as a water-tight acid-proof vessel, the walls of which are made of thin celluloid or like material, which receptacle fits snugly within an outer envelop 2, which is preferably made of some light material, such as paper, paste-board, or other compressed fibrous material, which may be shaped or molded to the desired form. The inner and outer vessels 1 and 2 are separable, so that if either of them becomes damaged it may be replaced by another, without discarding the entire jar or container. Within the jar or container is mounted a pair of plates or electrodes 3, which contain the active material, which may be of any appropriate character and which is preferably " formed " to constitute the positive and negative elements of the storage battery before being assembled in the cell. The active material is supported in each plate 3 by means of a light grid 5, which is preferably formed of lead either by casting or compressing. These grids 5 may be made much lighter than those ordinarily employed, and preferably take the form indicated in Fig. 2, in which the outer framework is formed integrally with diametrical and diagonal cross bars which define relatively large spaces within which the active material is compressed. Formed integrally with one upper corner of the grid 5 is a post 6 having a terminal 7, and provided with annular collars 8, for a purpose to be hereinafter described. As indicated, two of the grids 5, filled with suitable active materials, are supported and spaced apart within the jar, formed by the inner receptacle 1 and outer envelop 2, and surrounded by the electrolyte, which is made in the form of a relatively soft but consistent paste 10, preferably consisting of plaster-of-Paris mixed with sulfuric acid and water, said paste electrolyte being packed around the electrodes within the container to a height sufficient to fully cover the active parts of the plates or electrodes, as indicated in Fig. 1. Above the paste, there is placed a layer of charcoal or other suitable porous material. A small tube 13, formed of paper, pasteboard or the like coated and impregnated with paraffin or other acid-resisting material and having a series of lateral openings 14 in its lower portion, is located centrally within the jar, as indicated in Fig. 1, and the upper part of the jar above the layer of charcoal or the like, is filled to the level of the jar top with an insulating acid-resisting composition, such as pitch, tar or the like 12, which sets and hardens when cold and affords a sealing medium for the jar, and also serves to rigidly support the electrodes or plates 3 and the tube 13. It will be noted that the flanges or collars 8 on the posts 6 of the grids, are securely interlocked within the body of the hardened sealing material 12, so that all tendency of the plates or electrodes to become displaced, is obviated. It is also to be noted that the paste 10 completely fills the interior of the jar below the layer of porous material 14, and surrounds and embeds the plates or electrodes 3, thereby serving to hold the active material of the plates in the grids supporting the same and effectively preventing the separation and disruption of the active material, which is a serious difficulty, characteristic of many of the old types of storage battery plates.

As heretofore indicated, the plates or electrodes can be formed or charged before being placed in the cell, so that when the latter has been completely assembled, as described, it is ready for use. When the battery or cell has discharged or run down and requires recharging, all that is necessary to be done is to supply the necessary quantity of water to the cell through the tube 13, and to connect the terminals 7 with a charging circuit which is capable of delivering at least two and one-half volts per cell with a current of three-tenths to one-half an ampere for each cell, of substantially the same capacity as an ordinary dry primary cell. These cells will be completely recharged in approximately twenty-four hours, after which the remaining water is discharged by reversing the cell and permitting it to run out of the tube 13, after which the cell is ready for a further period of use.

In the old types of cells heretofore employed, it is customary to construct the grids for supporting the active material of the plates of heavy masses of lead, so disposed as to lock and confine the active material in place, thereby greatly increasing the weight of the plates and the expense of manufacturing the same, but without wholly obviating the difficulty of the active material breaking away and becoming separated from the grids, due to contraction and expansion. According to the present invention, however, the grids are made very light, each being in effect a mere skeleton framework sufficient to support the active material and to conduct the current generated, and when the active material has been applied to the grids and the formed plates embedded in the electrolyte paste 10, the latter serves to prevent, in a large measure, any breaking away or separation of the active material from the grids. Moreover, the skeleton-like form of the grids admits of relatively larger proportions of active material being applied thereto than has been possible heretofore, thereby increasing the capacity of the cells. In order to still further reduce the weight of the improved battery per unit or cell, and to render the same available for use in self-contained sets of multiple cells, it has been found of advantage to inclose several cells within a single outer container or envelop, as indicated in Fig. 4. To obviate the necessity of the separate external connections between the electrodes of adjacent cells, such electrodes have been formed by constructing the grids thereof integrally in pairs, as indicated in Fig. 3, that is to say, two grids 5', of the same general structural characteristics as that indicated in Fig. 2, are connected by an integral post or strap 6', which is bent in U form, so that the grids are parallel with each other. In constructing a battery of multiple cells, according to this principle, the outer envelop 2 is made of sufficient size to receive the desired number of separate inner containers 1, which are placed side by side within the outer envelop, as indicated in Fig. 4. The end plates or electrodes 3 of the series of cells are constructed like the individual plates or electrodes shown in Figs. 1 and 2. The intermediate plates or electrodes, however, are of the double construction indicated by the grids in Fig. 4, and are so disposed that one of the plates is suspended in one cell, while the other plate is suspended in the next adjacent cell, the yoke-shaped strap or bar 6' extending from one cell to the next through recesses cut in the upper portion of the walls of the inner containers 1. After the plates or electrodes have been assembled in the order indicated in Fig. 4, each of the cells is filled to the desired height with the electrolytic paste 10, upon which is placed a layer of charcoal or the like, over which is run a layer of tar, pitch or other acid-resisting sealing material, which serves to lock the electrodes in position and also to fix the vent and liquid supplying tubes 13 in proper relation. When so assembled, the battery comprises a number of cells or units, properly connected among themselves, with but two exposed electrodes, to wit, the outside electrodes at either end adapted to be connected with either the charging circuit or with the circuit to be supplied by the battery, and all of the interior parts of the individual cells are supported and maintained in proper relation with each other, and are not subject to derangement or displacement, but are capable of long continued, economical use.

What I claim is:—

1. A storage battery comprising a container, positive and negative electrodes mounted therein, and a paste of plaster-of-Paris and sulfuric acid constituting the electrolyte surrounding and embedding the electrodes within said container.

2. A dry storage battery comprising electrodes formed of relatively light open-work grids filled with active material, a container in which said electrodes are carried, and an electrolyte paste of plaster-of-Paris and sulfuric acid surrounding and supporting said electrode within said container.

In testimony whereof I affix my signature, in presence of two witnesses.

JOSEPH O. LUTHY.

Witnesses:
    YALE HICKS,
    BRUCE W. TEAGARDEN.